US009039515B2

(12) United States Patent
Iddings

(10) Patent No.: US 9,039,515 B2
(45) Date of Patent: May 26, 2015

(54) SERVER BASED GAMING SYSTEM PROVIDING MULTIPLE SIDE BET AWARDS

(75) Inventor: Cara Iddings, Henderson, NV (US)

(73) Assignee: IGT, Las Vegas, NV (US)

( * ) Notice: Subject to any disclaimer, the term of this patent is extended or adjusted under 35 U.S.C. 154(b) by 1807 days.

(21) Appl. No.: 11/924,396

(22) Filed: Oct. 25, 2007

(65) Prior Publication Data

US 2009/0111573 A1 Apr. 30, 2009

(51) Int. Cl.
*A63F 13/00* (2014.01)
*G07F 17/32* (2006.01)

(52) U.S. Cl.
CPC ........ *G07F 17/3267* (2013.01); *G07F 17/3244* (2013.01)

(58) Field of Classification Search
CPC . G07F 17/32; G07F 17/3225; G07F 17/3234; G07F 17/3262; G07F 17/3288
USPC .................................... 463/23, 25, 27, 29, 42
See application file for complete search history.

(56) References Cited

U.S. PATENT DOCUMENTS

| | | | |
|---|---|---|---|
| 4,669,730 | A | 6/1987 | Small |
| 4,743,002 | A | 5/1988 | Menzel |
| 4,922,522 | A | 5/1990 | Scanlon |
| 5,019,973 | A | 5/1991 | Wilcox et al. |
| 5,248,142 | A | 9/1993 | Breeding |
| 5,288,081 | A | 2/1994 | Breeding |
| 5,393,067 | A | 2/1995 | Paulsen et al. |
| 5,415,416 | A | 5/1995 | Scagnelli et al. |
| 5,472,194 | A | 12/1995 | Breeding et al. |
| 5,544,892 | A | 8/1996 | Breeding |
| 5,673,917 | A | 10/1997 | Vancura |
| 5,788,574 | A | 8/1998 | Ornstein et al. |
| 5,839,730 | A | 11/1998 | Pike |
| 5,967,896 | A | 10/1999 | Jorasch et al. |
| 6,019,374 | A | 2/2000 | Breeding |
| 6,056,641 | A | 5/2000 | Webb |
| 6,149,522 | A | 11/2000 | Alcorn et al. |
| 6,227,969 | B1 | 5/2001 | Yoseloff |
| 6,264,561 | B1 | 7/2001 | Saffari et al. |
| 6,336,857 | B1 | 1/2002 | McBride |
| 6,394,907 | B1 | 5/2002 | Rowe |
| 6,425,823 | B1 | 7/2002 | Byrne |
| 6,443,841 | B1 | 9/2002 | Rossides |
| 6,517,073 | B1 | 2/2003 | Vancura |
| 6,523,829 | B1 | 2/2003 | Walker et al. |
| 6,607,195 | B2 | 8/2003 | Vancura |
| 6,679,497 | B2 | 1/2004 | Walker et al. |
| 6,685,567 | B2 | 2/2004 | Cockerille et al. |
| 6,692,003 | B2 | 2/2004 | Potter et al. |

(Continued)

FOREIGN PATENT DOCUMENTS

WO WO 96/09102 3/1996

*Primary Examiner* — Omkar Deodhar
*Assistant Examiner* — Allen Chan
(74) *Attorney, Agent, or Firm* — Neal, Gerber & Eisenberg LLP

(57) ABSTRACT

A gaming system including at least one gaming machine enabling a player to select at least one of a plurality of different selectable side bets. A side bet controller maintaining at least one side bet. A side bet revenue manager configured to communicate with the gaming machine and side bet controller to accept and track fund data associated with a side bet from the gaming machine; transfer fund data to the side bet controller; accept and track fund data from the side bet controller; and transfer fund data to the gaming device.

15 Claims, 15 Drawing Sheets

(56) References Cited

U.S. PATENT DOCUMENTS

| | | | | |
|---|---|---|---|---|
| 6,702,289 | B1 | 3/2004 | Feola | |
| 6,726,565 | B2 | 4/2004 | Hughs-Baird | |
| 6,789,801 | B2 | 9/2004 | Snow | |
| 6,804,763 | B1 | 10/2004 | Stockdale et al. | |
| 6,863,608 | B1 | 3/2005 | LeMay et al. | |
| 6,866,586 | B2 | 3/2005 | Oberberger et al. | |
| 7,029,395 | B1 | 4/2006 | Baerlocher | |
| 7,111,845 | B2 | 9/2006 | Walker et al. | |
| 7,201,654 | B1 | 4/2007 | Jarvis et al. | |
| 7,329,179 | B2 | 2/2008 | Baerlocher | |
| 7,351,146 | B2 | 4/2008 | Kaminkow | |
| 2003/0073497 | A1 | 4/2003 | Nelson | |
| 2003/0137110 | A1* | 7/2003 | Huard et al. | 273/292 |
| 2003/0144053 | A1 | 7/2003 | Michaelson | |
| 2003/0203756 | A1 | 10/2003 | Jackson | |
| 2004/0002379 | A1 | 1/2004 | Parrott et al. | |
| 2004/0063492 | A1 | 4/2004 | Baerlocher et al. | |
| 2004/0070146 | A1 | 4/2004 | Snow | |
| 2004/0084843 | A1 | 5/2004 | Snow | |
| 2004/0090003 | A1 | 5/2004 | Snow | |
| 2004/0090005 | A1 | 5/2004 | Snow | |
| 2004/0147314 | A1 | 7/2004 | LeMay et al. | |
| 2004/0219968 | A1* | 11/2004 | Fiden et al. | 463/20 |
| 2005/0085288 | A1 | 4/2005 | Schugar et al. | |
| 2005/0192099 | A1 | 9/2005 | Nguyen et al. | |
| 2005/0233803 | A1 | 10/2005 | Yang | |
| 2005/0239542 | A1 | 10/2005 | Olsen | |
| 2005/0282628 | A1* | 12/2005 | Beatty et al. | 463/27 |
| 2006/0040732 | A1 | 2/2006 | Baerlocher et al. | |
| 2006/0046823 | A1* | 3/2006 | Kaminkow et al. | 463/16 |
| 2006/0073882 | A1 | 4/2006 | Rozkin et al. | |
| 2006/0128457 | A1 | 6/2006 | Cannon | |
| 2006/0205484 | A1* | 9/2006 | Nicastro | 463/25 |
| 2006/0211473 | A1 | 9/2006 | Walker et al. | |
| 2006/0247010 | A1 | 11/2006 | Gagner | |
| 2007/0054726 | A1 | 3/2007 | Muir et al. | |
| 2007/0060314 | A1 | 3/2007 | Baerlocher et al. | |
| 2007/0060321 | A1 | 3/2007 | Vasquez et al. | |
| 2007/0102877 | A1 | 5/2007 | Personius et al. | |
| 2007/0155482 | A1 | 7/2007 | Walker et al. | |
| 2007/0155483 | A1 | 7/2007 | Walker et al. | |
| 2007/0155484 | A1 | 7/2007 | Walker et al. | |
| 2007/0191088 | A1 | 8/2007 | Breckner et al. | |
| 2007/0243925 | A1 | 10/2007 | LeMay et al. | |
| 2007/0273097 | A1 | 11/2007 | Kirkutis | |
| 2007/0293293 | A1 | 12/2007 | Baerlocher et al. | |
| 2008/0067745 | A1 | 3/2008 | Wikstrom | |
| 2008/0076496 | A1 | 3/2008 | Baerlocher et al. | |
| 2008/0076531 | A1 | 3/2008 | Baerlocher et al. | |
| 2008/0076532 | A1 | 3/2008 | Graham et al. | |
| 2008/0076542 | A1 | 3/2008 | Iddings et al. | |
| 2008/0108425 | A1 | 5/2008 | Oberberger | |
| 2008/0146344 | A1 | 6/2008 | Rowe et al. | |

* cited by examiner

FIG. 2

| Side Bet | Side Bet Amount | For Gaming Machine |
|---|---|---|
| Bet For Bonus | $2.00 | 10a |
| Progressive | $0.50 | 10b |

| Gaming Machine | Total Side Bets Placed | Total Side Bet Awards Won |
|---|---|---|
| 10a | $2.50 | $2.00 |
| 10b | $0.00 | $0.00 |

| Side Bets | Total Amount In | Total Amounts Out |
|---|---|---|
| Bet For Bonus | $2.00 | $2.00 |
| Progressive | $0.50 | $0.00 |
| Peer Bet | $0.00 | $0.00 |

SERVER BASED GAMING SYSTEM PROVIDING MULTIPLE SIDE BET AWARDS

BACKGROUND

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (i.e., the higher the wager, the higher the award). Symbols or symbol combinations which are less likely to occur usually provide higher awards.

Secondary or bonus games are also known in gaming machines. These secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game of the gaming machine. For instance, a bonus symbol occurring on a payline on the third reel of a three reel slot machine may trigger the secondary bonus game on that gaming device. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Server based gaming is also known. In a server based gaming environment, a central server is configured to alter the content and/or settings of a particular gaming machine in communication with the central server. In this manner, the gaming machine in communication with the central server is configured to receive certain commands and/or prompts from the central server which will cause the game to act in a specific manner.

Side bets are also a known feature in gaming. Side bets enable a player to place one or more wagers on one or more aspects of a players gaming experience which is in addition to any primary or base game wager. In one form, a side bet is directed to a specific feature or function that the player desires, such as a side wager on a bonus game, a side wager to be eligible to win a progressive award, and a side wager on the generation of a specific game outcome. Such known side bets or side wagers do not typically affect the awards of a paytable.

A gaming establishment or casino may include thousands of gaming devices. In certain known side bet systems, a fixed relationship exists between each gaming device and the side bets associated with that gaming device. A player at a specific gaming device may only place the dedicated side bets associated with that specifically played gaming device. That is, known gaming devices are pre-configured for specific side bets because the side bet is accounted for in the programming of the gaming device (which resides at the gaming device). Moreover, known gaming devices are further pre-configured for specific side bets because these gaming devices are designed with a dedicated side bet button as part of the button panel. Thus, it is a relatively simple task to track and allocate the side bets and side bet payouts on a stand alone gaming machine through conventional methods such as those already in place to track standard wagers and payouts.

In server based gaming, however, tracking and accounting of side bets and side bet payouts is a challenge because of the large number of different games and side bets available with each game. There is no existing way for efficiently and reliably keeping track of all side bet wager amounts and all side bet payouts for a virtually unlimited amount of side bet options offered at hundreds or even thousands of different gaming machines in a gaming system.

Accordingly, a need exists to provide a gaming system wherein all of the different types of side bets associated with different games are properly accounted and appropriately tracked. There is also a continuing need to provide new and different gaming machines and gaming systems as well as new and different ways to provide awards to players including bonus awards. There is also a continuing need to provide new and different linked or related gaming machines.

SUMMARY

In one embodiment, the gaming system disclosed herein includes a central server, central controller or remote host in communication with or linked to a plurality of gaming machines or gaming devices. The gaming system also includes a side bet revenue manager and a side bet controller. The side bet controller handles the wager placement, game play, and game result calculations associated with each placed side bet. The revenue manager facilitates the movement of information or data representing funds, money, credits or any of these values ("fund data") between the side bet controller and each of the gaming machines. In one embodiment, the fund data associated with one or more side bets placed is transferred or communicated from the gaming device to the revenue manager for accounting and tracking purposes and then further transferred or communicated to the side bet controller. This embodiment enables an accounting feature in tracking and allocating side bets and side bet awards through the revenue manager, solving the logistical problems inherent in implementing multiple side bets from multiple gaming machines in a gaming system. That is, the gaming system and method disclosed herein provides a side bet system that is compatible with existing gaming devices and dynamic to account for players placing one or more side bets on any number of features or functions of any number of gaming devices.

In one embodiment, the gaming system enables one or more players to each place one or more side bets associated with one or more games played at that players currently played gaming device or associated with any event or game occurring at or in association with another gaming device in the gaming system. In one embodiment, the side bet controller has one or more meters to track the side bet functionality, such as wins and losses associated with the side bet. In this embodiment, the meters are configured to track and adjust for the fund data received from the revenue manager associated with the side bet, and the fund data sent to the revenue manager associated with the payout provided for winning the side bet as well as other performance statistics such as each gaming devices relative hold percentage of side wagers placed. In one embodiment, the side bet controller is configured to maintain a separate meter for all of the different side bets associated with a side bet gaming system.

In one embodiment, the central server is part of or in communication with at least one side bet revenue manager. The side bet revenue manager is configured to track and account for fund data associated with one or more separate side bets. In one embodiment, the side bet revenue manager facilitates movement of fund data between the side bet controller and the gaming devices of the gaming system. In one embodiment, the side bet revenue manager also monitors the meters from the side bet controller. In one embodiment, this monitoring enables the side bet revenue manager to provide consolidated reporting for accounting purposes. In this embodiment, the gaming machine is essentially transferring the fund data associated with one or more side bets to the revenue manager to be accounted and transferred to the side bet controller. In one embodiment, the side bet revenue manager communicates with the gaming machine to coordinate one or more side bets with the desired side bet functionality. In another embodiment, the side bet revenue manager is configured to track performance statistics associated with the side bets.

In one embodiment, one or more of the side bet controllers each track and maintain a separate one of the side bets. In another embodiment, one or more of the side bet controllers each maintains a plurality of side bets. In one embodiment, one or more of the side bet controllers are each associated with one or more gaming devices in the gaming system. In this embodiment, if a gaming device is associated with a side bet controller, the side bet placed at that gaming machine is associated with a side bet award maintained by the associated side bet controller. In one embodiment, if a gaming device is associated with a side bet controller, upon a suitable triggering event, the side bet award (or one or more of the plurality of side bet awards) maintained by the side bet controller is provided to a player at one of the gaming devices associated with that side bet.

In operation of one embodiment, the player enters or deposits funds into the gaming machine. The gaming machine offers one or more side bets available in the gaming system. The player then selects one or more of the available side bets. To fund the side bet, the gaming machine transfers fund data representative of the value of part or all of the deposited funds to the side bet controller through the revenue manager. In this embodiment, the revenue manager tracks this transfer as an "Out" transaction for the gaming machine and an "In" transaction for the side bet controller. Further, if the player wins the side bet, the side bet controller transfers fund data representative of the value of the side bet award to the gaming machine through the revenue manager. In this embodiment, the revenue manager tracks this transfer as an "Out" transaction for the side bet controller, and an "In" transaction for the gaming machine. The gaming machine then pays the player through a normal credit or hand-pay method and the gaming machine meters that pay in a conventional manner.

In one embodiment, enabling players to place side bets on one or more outcomes or other variables provides each player the potential to select from multiple different side bet options that are available through the central server. In one embodiment, the gaming system enables the side bet controller to cause a portion of the display device to display the side bet functionality simultaneously with the play of the primary game. In this embodiment, the side bet display enables the player to explore the various games available as well as the available side bets. In one embodiment, the gaming device enables the player to make side bet selections and wagers through the side bet display. These embodiments enable any player to place a wager through the side bet display on a designated event occurring, even if the player is not currently on a gaming machine that is directly associated with the designated event.

In one embodiment, the side bet controller enables the gaming system operator to: offer the player a choice from a certain set of side bets, decide which side bets to offer a player, change the side bets offered to a player based on any number or type of criteria, and/or enable the player to choose which side bet they want to make. In another embodiment, the gaming system disclosed herein provides the gaming system operator with the ability to configure the amount required to place a side bet, decide which of a plurality of side bets to offer one or more players, and/or temporarily or permanently disable one or more side bet.

In various embodiments of the gaming system disclosed herein, the side bet controller enables a variable number of side bets and gaming devices associated with the side bet controller. By enabling the revenue manager to track and account for the fund data associated with the side bet, a great deal of flexibility is added to the gaming system as the accounting system for the side bets are not tied to a single gaming device. This enables the gaming system to be easily adapted, configured, or changed. The gaming system and method disclosed herein enables the gambling establishment or casino to easily and reliably track and account for a variety of different side bets and side bet awards.

The usage of a side bet controller to handle the wager placement, game play, and game results calculation associated with the side bet enables for flexibility and enhancements as well as ease of accounting in gaming systems that are not possible with the current gaming systems. A gaming system with a side bet controller enables an operator to dynamically change side bets or side bet award types, add or remove a gaming machine from association with a side bet, easily add multiple side bets associated with the same gaming device, and keep track of the fund data associated with all of the above. Additionally, the gaming system disclosed herein enables for greater control and adaptability of accounting systems for stand-alone gaming devices offering a side bet option.

Additional features and advantages are described in, and will be apparent from, the following Detailed Description and the figures.

BRIEF DESCRIPTION OF THE FIGURES

FIG. 2 is a chart illustrating one example of tracking and accounting the fund data associated with each side bet.

DETAILED DESCRIPTION

Generally, the gaming system and method disclosed herein enables a player to place one or more side bets associated with one or more games played at that players currently played gaming device or associated with any event or game occurring at or in association with another gaming device in the gaming system. The gaming system and method disclosed herein enables a gaming establishment or casino to properly account and track all of the different types of side bets associated with the different games in the gaming system.

In one embodiment, the gaming system includes a revenue manager. In one embodiment, the gaming system further includes one or more side bet controllers.

Figure 1:
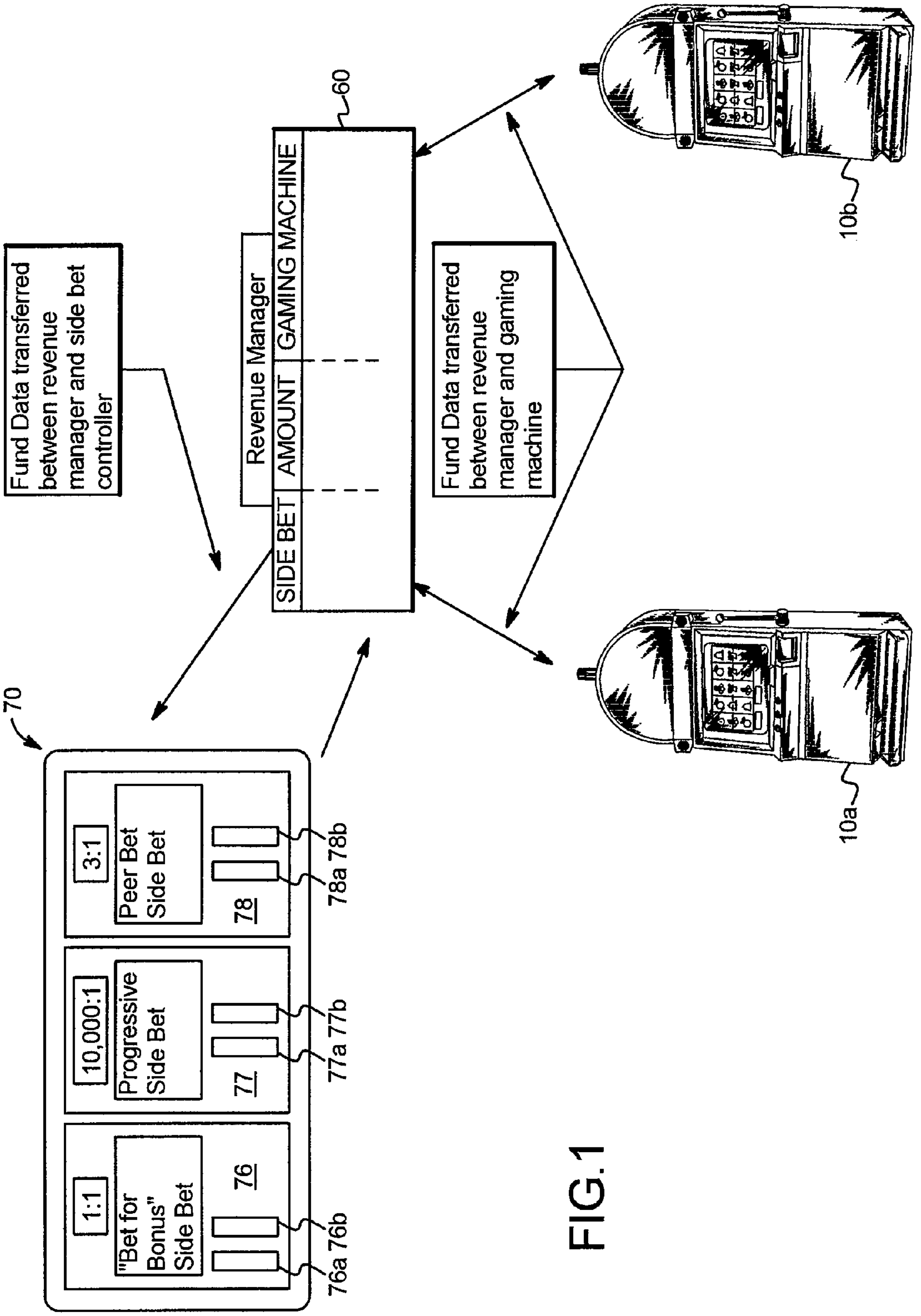
FIGS. 1, 1A, and 1B, are views of a gaming device, revenue manager, and side bet controller of one embodiment of the gaming device.

As illustrated in FIG. 1, the revenue manager 60 facilitates, all movement of information or data representing funds, money, credits or any of these values ("fund data") between a gaming machine 10 and a side bet controller 70. The revenue manager 60 tracks the fund data and monitors meters from the side bet controller(s) 70 to track the amount of money wagered on side bets as well as the amount of money paid out to players from side bet awards. As illustrated in FIG. 2, by tracking and accounting for the fund data, the revenue manager is able to provide consolidated reporting for the purposes of accounting.

In one embodiment, the side bet controller 70 manages the side bet functionality, such as the wager placement, game play, and game result calculations associated with one or more placed side bets at gaming devices in the gaming system. In one embodiment, the side bet controller contains a number of meters associated with each potential side bet 76, 77, 78. The side bet controller receives fund data associated with a particular side bet from the revenue manager and increments the appropriate side bet meter accordingly.

In one embodiment, the side bet controller determines the outcome of placed side bets by monitoring an external occurrence. For example, if a player at a gaming device in the gaming system places a side bet on a sports game, the outcome of the side bet would not be determined by the side bet controller, but the side bet controller would be configured to obtain this data from an external source. In one embodiment, the side bet controller itself generates the outcome of a placed side bet.

In one embodiment, the side bet controller calculates the game results associated with one or more placed side bets. For example, if a player placed a side bet of 1 dollar at 3 to 1 odds that an event would occur, and that event did in fact occur, the side bet controller would calculate the side bet award of 3 dollars. In one embodiment, the side bet controller increments a meter corresponding to the side bet award. The side bet controller then transfers fund data associated with the side bet award to the revenue manager for tracking and accounting purposes. As discussed above, in one embodiment, the revenue manager 60 tracks the fund data and monitors the meters from the side bet controller 70 to track the amount of money wagered on side bets as well as the amount of money paid out to players from side bet awards.

In one embodiment, at least one gaming device in the gaming system provides the player with an opportunity to place a side bet. The gaming device enables a player to place the side bet at any time before, during, or after the primary game. In one such embodiment, a player places a side bet to obtain eligibility into an event that may or may not occur, wherein if the event occurs, the player participates in the event. In another such embodiment, a player places a side bet that a specific outcome will occur. In one embodiment, a player may place a side bet on any suitable event occurring in association with one or more gaming devices in the gaming system including but not limited to: a side bet that a bonus will occur, a side bet that a progressive will hit; side bets on back betting, peer betting, and insurance; a side bet a result will occur, a side bet specific outcome will occur in a specific game, a side bet an outcome will occur for another patron, a side bet on a sporting event; side bets on other ways to win, money back, tournament play, premium play, side games, team play, play for me, or any other type of side bet desired that may potentially provide a win. In one embodiment, for example, a player may place a side bet on whether a bonus will occur on their gaming device within the next ten minutes. In another embodiment, a player may place a side bet on whether they will win or lose on their next spin. In another embodiment, a player may place a side bet on whether a certain outcome will occur on a different gaming machine in the gaming system, wherein the other gaming machine determines the outcome which the player placed a side bet on. In this regard, there are any number of side bets a player may play for at any one time.

Figure 3:
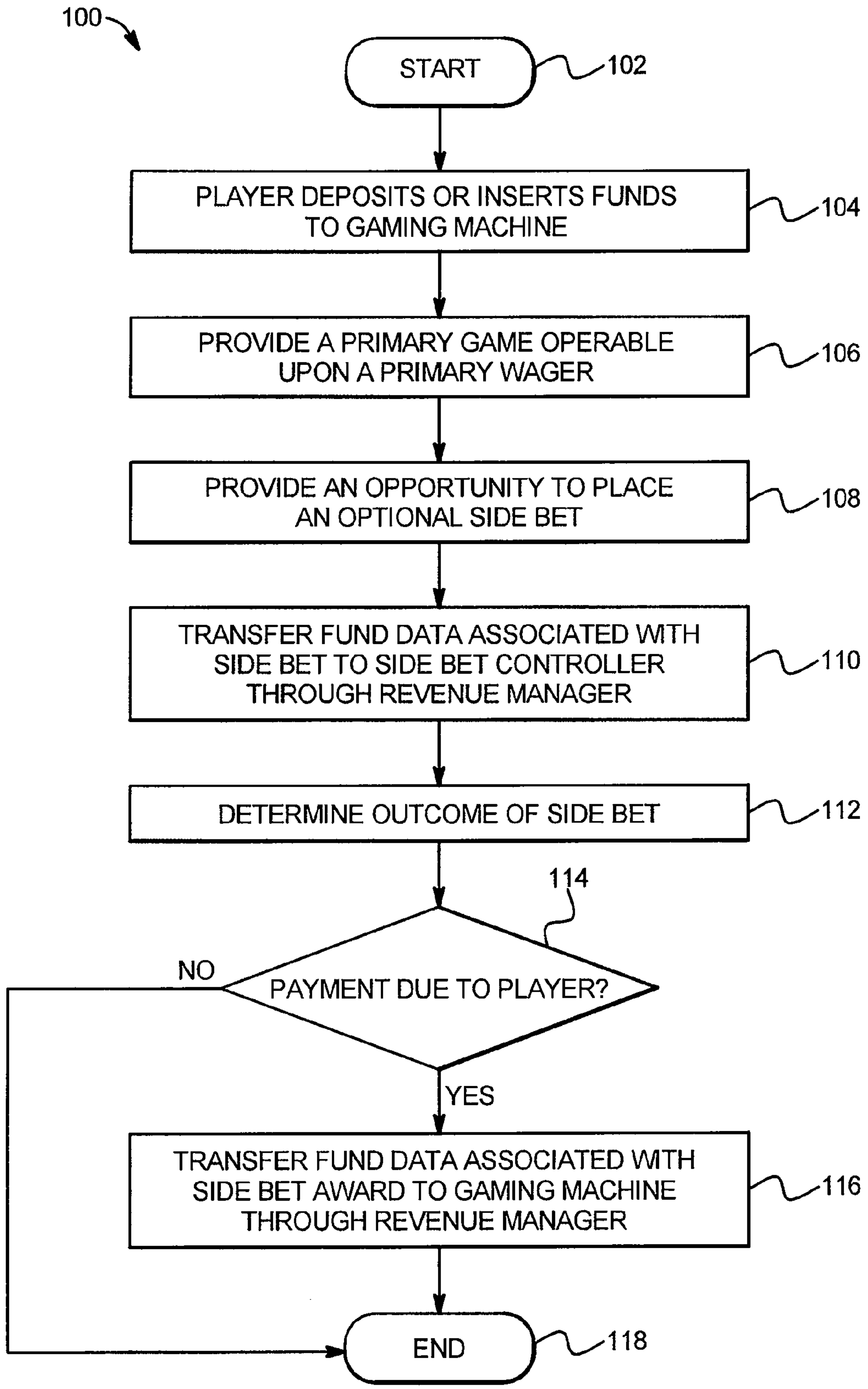
FIGS. 3, 4, and 5 are flowcharts of an example accounting process for an optional side bet via a gaming device according to one embodiment of the methods and apparatus of the present system.

Referring now to FIG. 3, a flowchart of an example process 100 for the tracking and accounting of funds associated with side bets is illustrated. In one embodiment, the process 100 is embodied in one or more software programs stored in one or more memory devices and executed by one or more processors or controllers. Although the process 100 is described with reference to the flowchart illustrated in FIG. 3, it should be appreciated that many other methods of performing the acts associated with process 100 may be used. For example, the order of many of the blocks may be changed, and many of the blocks described may be optional.

In one embodiment, the process 100 begins when a player deposits or otherwise transfers funds to a gaming device. The process provides a primary game operable upon a primary wager as indicated by block 106. The primary game can be a slot game, a poker game, any game disclosed herein, or any other suitable game. In the example process 100, the primary game is a slot game that includes a plurality of reels having a plurality of symbols on or associated with each reel.

The process 100 includes providing an opportunity to place an optional side bet as indicated by block 108. In one embodiment, the player may make the side bet prior to the start of a play of the primary game. In another embodiment, the player may make the side bet during a play of the primary game. The player may place the side bet sequentially or as a recurring side bet over multiple plays of the primary game. In another embodiment, the player may place the side bet simultaneously for a plurality of plays of the primary games. In one such instance, the player places a plurality of individual side bets (or one collective side bet including multiple individual side bets) prior to or during one or more plays of the primary game. As indicated by block 110, once the player places a side bet, the fund data associated with the side bet is transferred to the side bet controller through the revenue manager. The outcome of the side bet is determined as indicated by block 112. As indicated by blocks 114, 116, and 118, if payment is due to the player the fund data associated with the side bet award is transferred to the gaming machine through the revenue manager.

Figure 4:
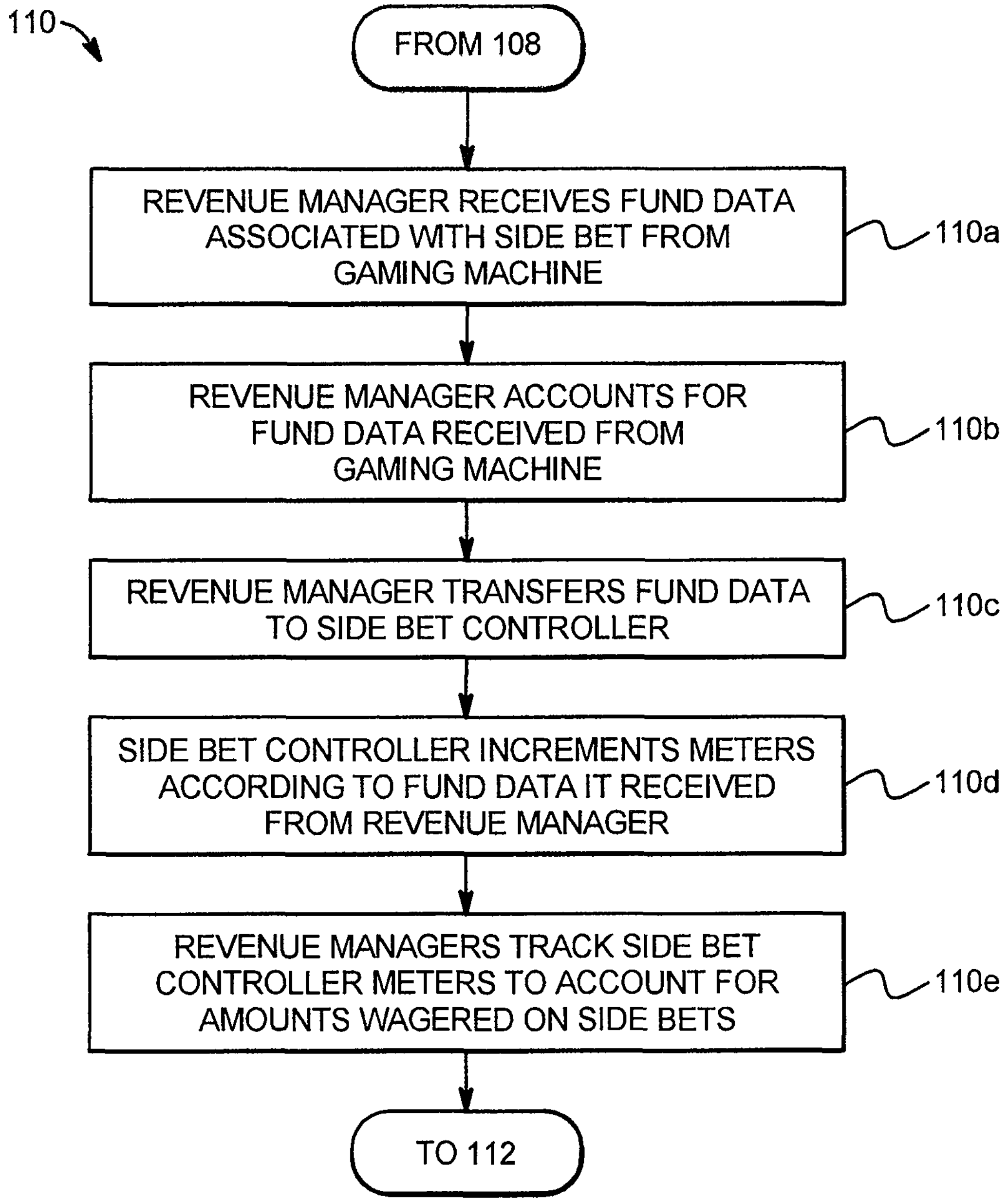

The transfer of fund data from the gaming machine, through the revenue manager for accounting, and to the side bet controller is illustrated in more detail in FIG. 4. As indicated by blocks 110*a* and 110*b*, once the player places the side bet, the fund data associated with the side bet is transferred to the revenue manager where it is tracked and accounted. After accounting for the fund data, the revenue manager transfers the fund data to the side bet controller, as indicated by block 110*c*. As indicated by block 110*d*, the side bet controller increments meters according to the fund data it received from the revenue manager. The revenue manager tracks the meters from the side bet controller and accounts for the fund data such as the amount wagered on each side bet.

Figure 5:
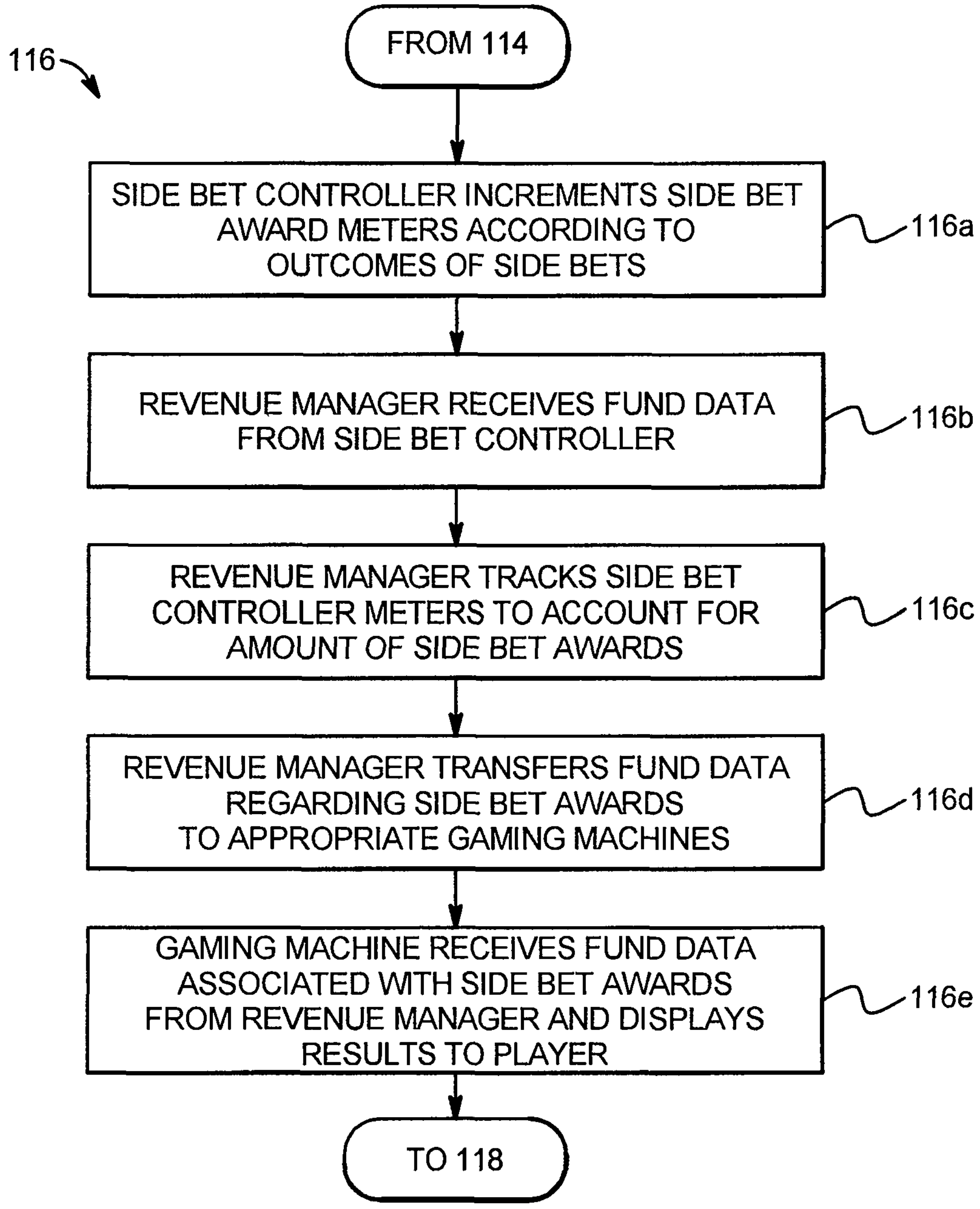

FIG. 5 further illustrates the tracking and accounting process once the outcome of the side bet is determined. As indicated by block 116*a*, the side bet controller increments meters according to the outcomes of the side bets. As indicated in blocks 116*b* and 116*c*, the revenue manager receives the fund data from the side bet controller and tracks the side bet controller meters to account for the fund data associated with any side bet award. The revenue manager then transfers the fund data to the appropriate gaming machine for display and payment (if necessary) to the player, as indicated by blocks 116*d* and 116*e*. In one embodiment, the revenue manager facilitates all fund data movement between a side bet controller and the gaming machine. For example, as illustrated in FIG. 1, the fund data associated with side bets placed on a number of gaming machines is transferred from the gaming machines 10*a* and 10*b* to the side bet revenue manager 60 for tracking and accounting purposes.

Figure 6:
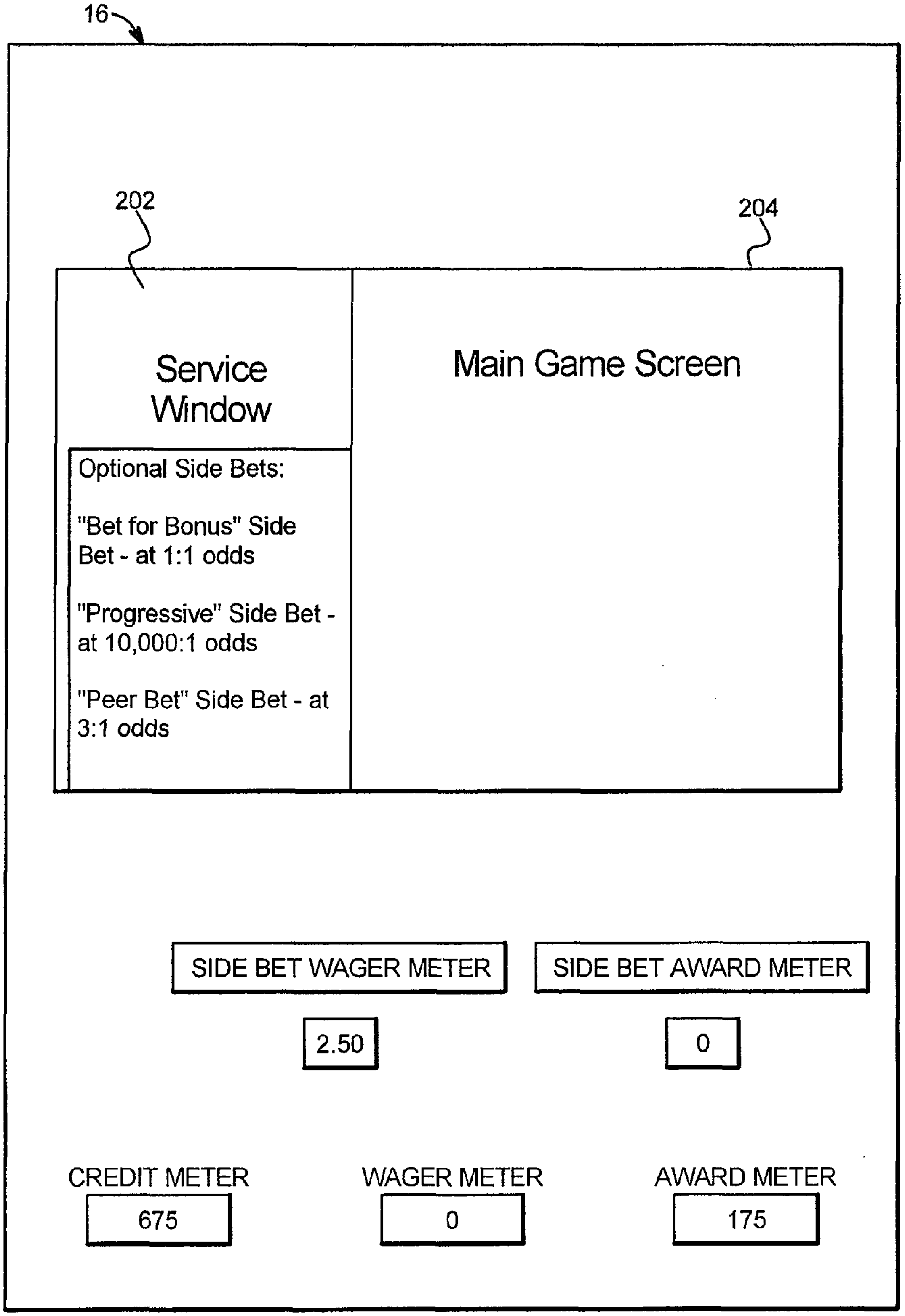
FIGS. 6, 6A, and 7 are views of a display device of one embodiment of the gaming device.

In one embodiment, one or more gaming machines display a screen or menu which enables a player to explore the various games as well as the various side bets maintained by the side bet controller. In this embodiment, the player selects which side bets to wager on through the service window and the gaming device is connected to or otherwise associated with the side bet controller which maintains the available side bets. As illustrated in FIG. 6, for example, the service window 202 displays the available side bet(s). The player then chooses to place two side bets, one for $2.00 and the other for $0.50. The $2.50 is deducted from the credit meter 206 of the gaming device and transferred added to the side bet wager meter.

Figure 1A:
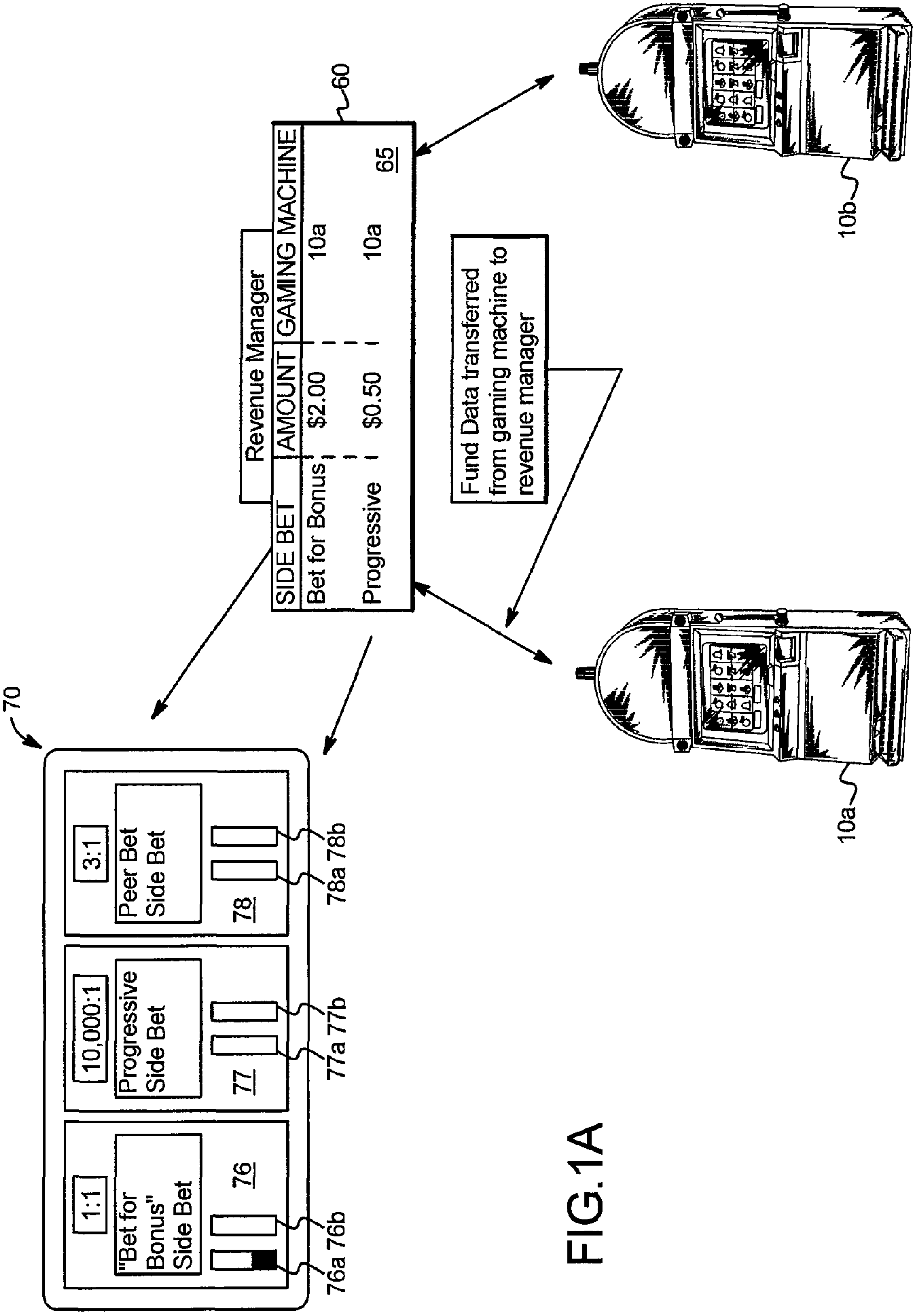

A player that sits down at gaming machine 10*a* in FIG. 1A would see the display illustrated in FIG. 6. The screen 204, of FIG. 6, shows three available side bets: the “Bet for Bonus” side bet; the “Progressive” side bet; and the “Peer Bet” side bet. These three available side bets correspond to the three side bets 76, 77, and 78 of the side bet controller 70 of FIGS. 1A and 1B. As illustrated in FIG. 1A, if the player at gaming machine 10*a* wagers $2 on the “Bet for Bonus” side bet and $0.50 on the “Progressive” side bet, the fund data from gaming machine 10*a* including the amount of the side bets, is transferred to the revenue manager 60 where it is tracked 65. The revenue manager 60 then transfers the fund data to the side bet controller 70 and the side bet controller increments the appropriate meters 76*a* and 77*a* representing money wagered (“IN”) on the “Bet for Bonus” side bet 76 and the “Progressive” side bet 77.

Figure 1B:
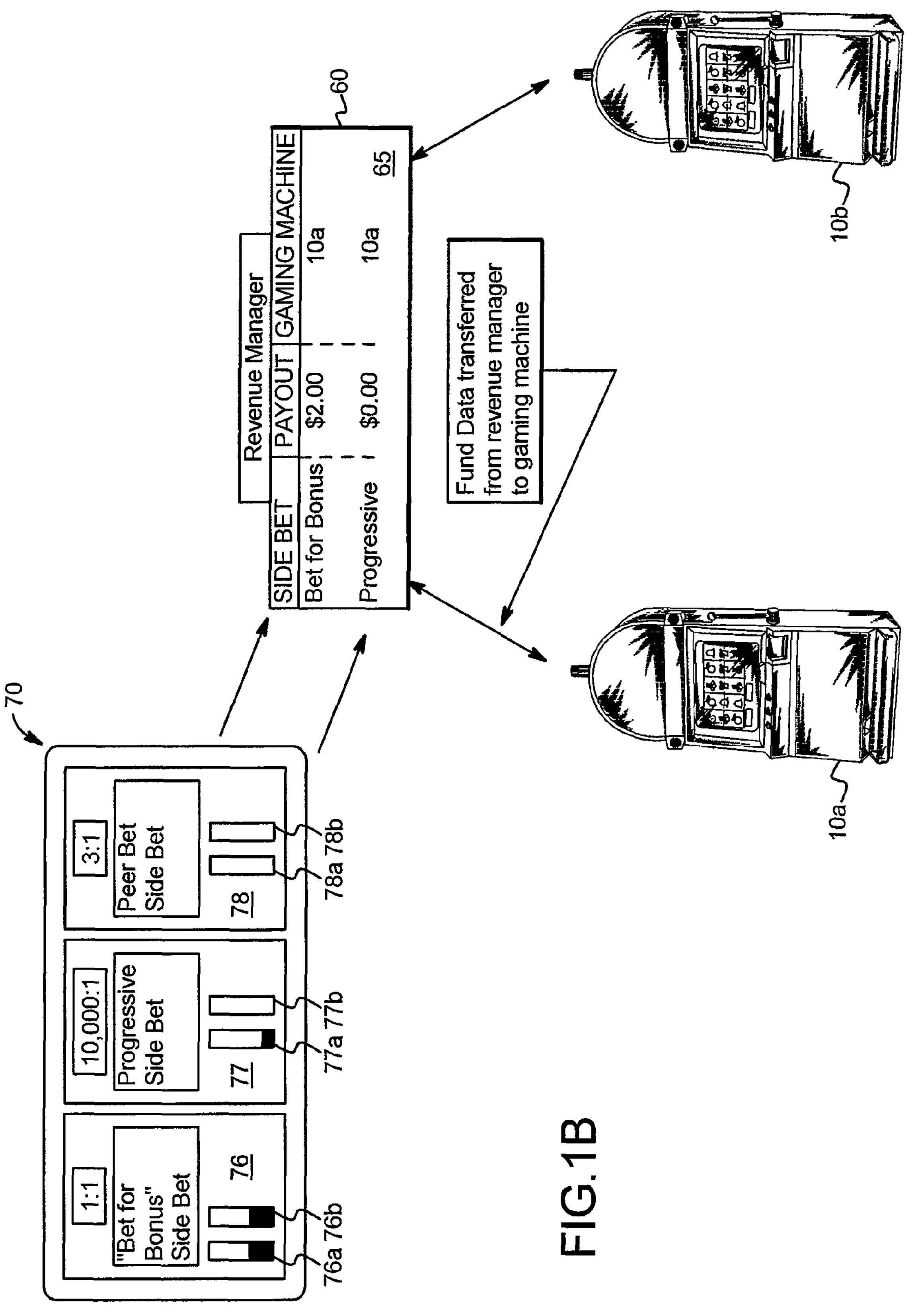

As illustrated in FIG. 1B, if the “Bet for Bonus” side bet 76 results in a side bet award and the “Progressive” side bet 77 does not, the side bet controller 70 increments the meter 76*b* corresponding to the side bet award (“OUT”) for the “Bet for Bonus” side bet 76. Fund data associated with any side bets award (payouts) is then transferred from the side bet controller 70 to the revenue manager 60. The revenue manager accounts for the fund data related to the side bet award by tracking the meters 76*a*, 76*b* and 77*a*, 77*b* of the side bet controller 70. By tracking the meters, the revenue manager can easily track, account, and report the side bet fund data throughout the gaming system.

Figure 6A:
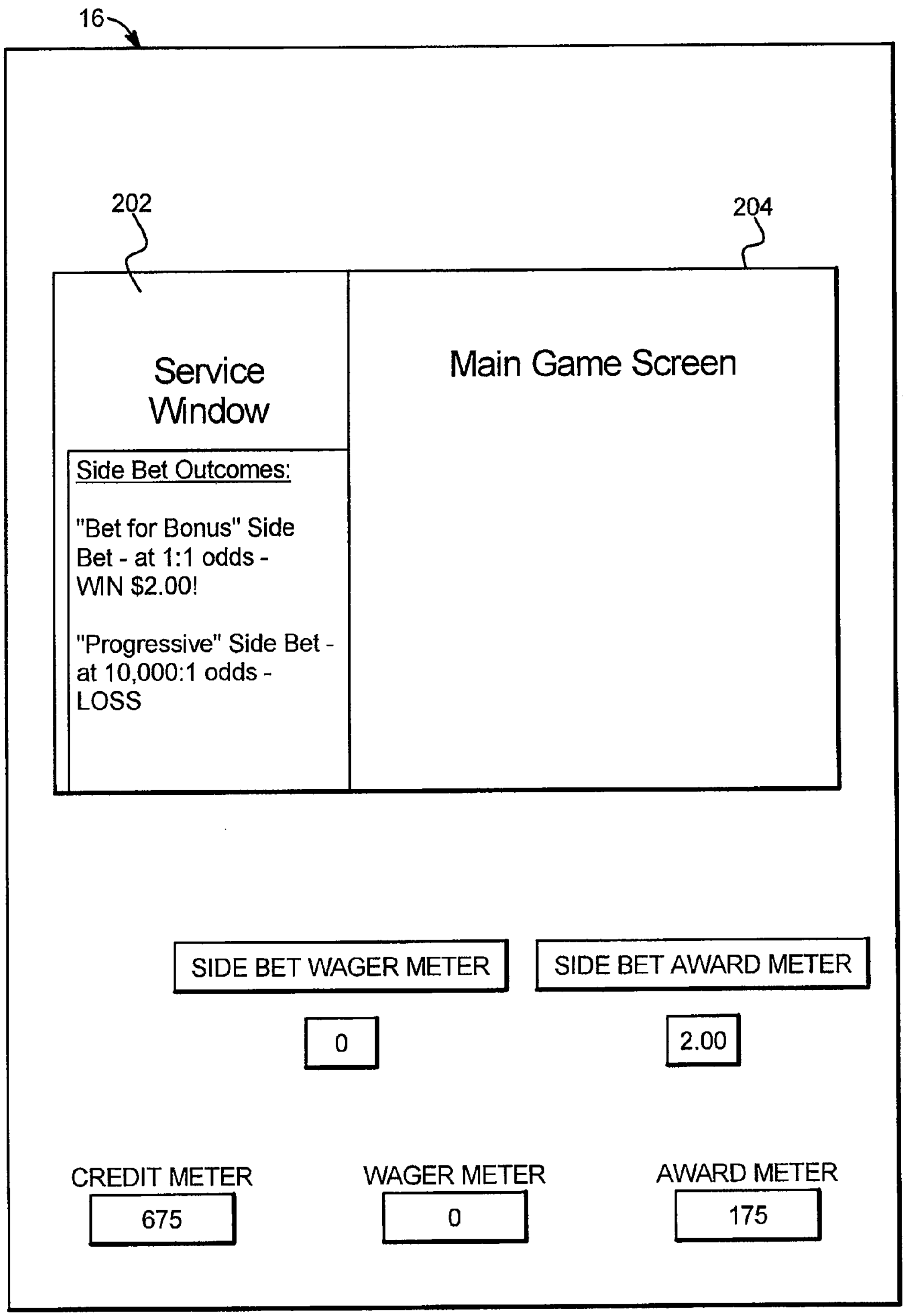

Finally, as further illustrated in FIG. 1B, the revenue manager 60 transfers the fund data to the gaming machine 10*a* for display and/or payment to the player. The player sees the display as illustrated in FIG. 6*a*. In this embodiment, as illustrated in FIG. 2, the revenue manager is able to provide consolidated reporting of side bets and side bet payouts for each gaming machine or each side bet for accounting and tax purposes.

In one embodiment, as illustrated in FIGS. 1, 1A, and 1B, the revenue manager 60 works with the gaming machine 10 to coordinate the wagers to be applied to the appropriate side bet functions 76, 77, and 78. For example, the fund data associated with the two side bets from gaming machine 10*a* are transferred to the revenue manager 60 where they are tracked and accounted as shown in FIG. 1A. As illustrated in FIG. 1B, the revenue manager 60 then transfers the fund data to the side bet controller 70 where it is matched up with the appropriate side bet functionality 76, 77, and 78 associated with the particular side bet. In this regard, one $0.50 side bet from gaming machine 10*a* is associated with the “Progressive” side bet 77 with 10,000:1 odds, and the second $2.00 side bet is associated with the “Bet for bonus” side bet 76 with 1:1 odds. As illustrated in FIG. 1B, if the $2.00 “Bet for Bonus” side bet 76 wins, the fund data associated with the $2.00 side bet award ($2.00×1) is transferred from the side bet controller 70 to the revenue manager 60 which tracks and accounts the side bet fund data associated with the payout. As illustrated in FIG. 1B, the side bet fund data ($2.00) associated with the “Bet for Bonus” side bet award is then transferred from the revenue manager 60 to the appropriate gaming machine 10*d*.

In one embodiment, each side bet controller analyzes whether conditions are appropriate to offer a player a side bet. The relevant conditions may include but are not limited to: how the player’s game has progressed; the number of credits the player is playing; historic information of the player; the size of the side bet the player is willing to play; a player meeting certain gaming system operator and/or gaming establishment operator defined criteria, or any other type of criteria. In one embodiment, the side bet controller 70 dynamically creates a side bet based on the players win rate. For example, as illustrated in FIG. 7, if the player has won on the last three plays of a slot machine, the side bet controller may offer the player a side bet on whether the next play will be a win or a loss.

Figure 7:
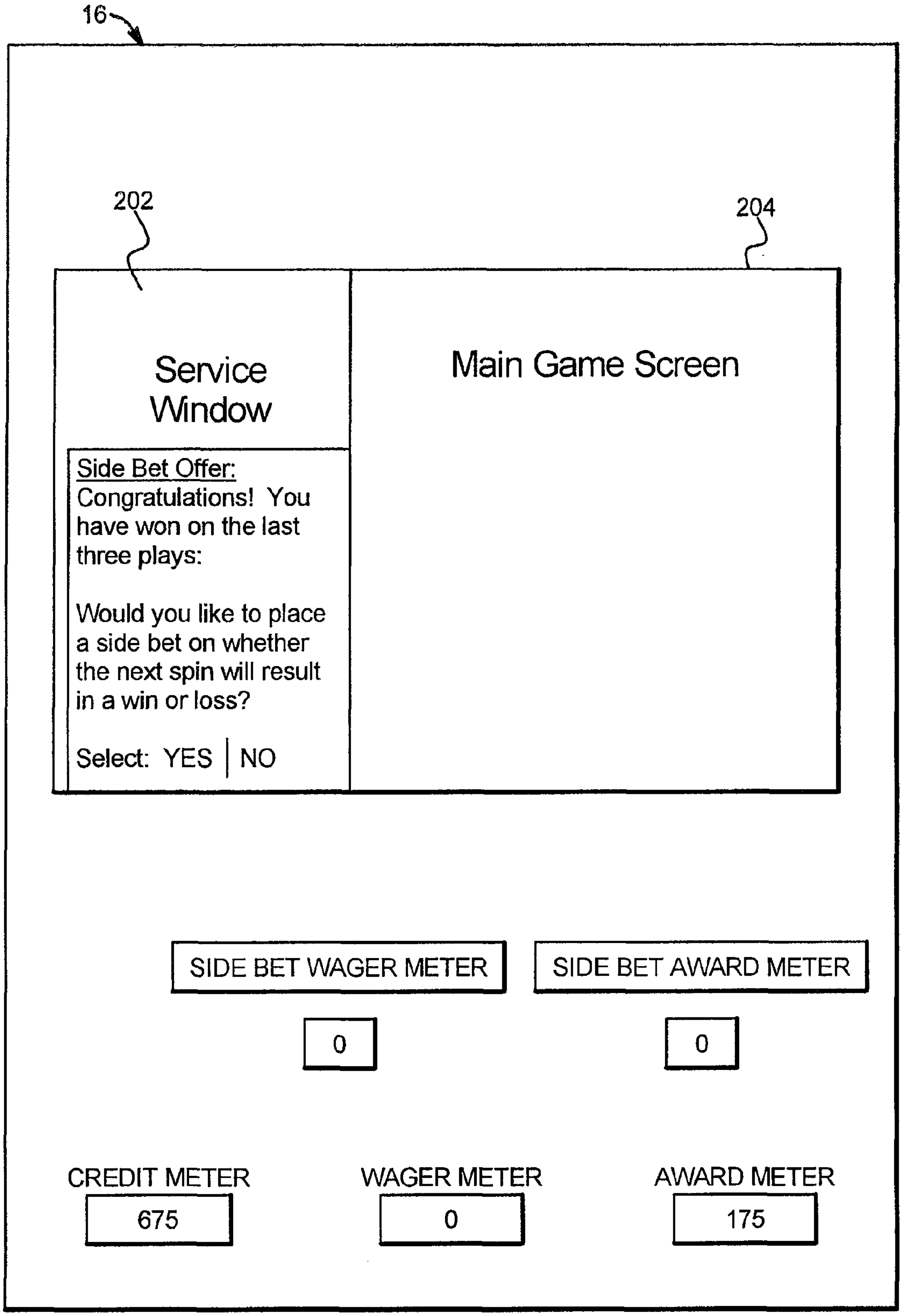

As illustrated in FIG. 7, in one embodiment, the side bet controller 70 may make a side bet offer to a player. In this embodiment, the side bet may be offered to the player through a service window 202 on the display device 16 of the gaming machine 10. In one embodiment, the service window 202 is displayed adjacent to the main window 204 of the display device 16.

In one embodiment, the side bet controller 70 generates its own revenue and expenses by accounting for placed side bets and side bet payouts. In this embodiment, the side bet controller 70 is treated as its own gaming entity (much like the electronic gaming machine) for accounting and tax purposes.

In one embodiment, as illustrated in FIG. 1, the side bet controller 70 has one or more meters that track the side bet functionality. The side bet controller 70 is capable of maintaining a large number of meters. In one embodiment, each meter corresponds to a different side bet 76, 77, 78 available in the gaming system. In one embodiment, the meters are capable of tracking fund data in (side bets) and fund data out (payouts) as well as tracking their hold percentage from this information. For example, as illustrated in FIG. 1B, the “IN meter” of the side bets 76 and 77 increase once the fund data is transferred to the side bet controller 70 from the revenue manager 60. As illustrated in FIG. 1B, the “Bet for Bonus” side bet 77 resulted in a side bet award so the OUT meter the increased. The related fund data from all the meters is then transferred to the revenue manager 60 for tracking and accounting purposes.

In another embodiment, the In and Out fund data transfers may be made via cashless transfer meters typical of advanced gaming machines. For example, the gaming machine could use a suitable protocol or distinct transfer meters.

In one embodiment, the revenue manager monitors the meters from the side bet controllers 70. For example, as illustrated in FIGS. 1A and 1B, fund data from the meters is collected and tracked by the revenue manager 60 allowing the revenue manager to provide consolidated reporting for the purpose of accounting.

In one embodiment the side bet controller 70 maintains a number of different side bets. Side bets may include: bonus bet, progressive bet, back betting, peer betting, insurance, results, game specific outcomes, outcomes for other patrons, sports betting, other ways to win, money back, tournament, premium play, playing side game, team pay, play for me, or any other type of side bet desired by a designer. In one embodiment, some of the side bets offered to the player may only be available in certain games. In another embodiment, some of the side bets may be available in any game.

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 8A:
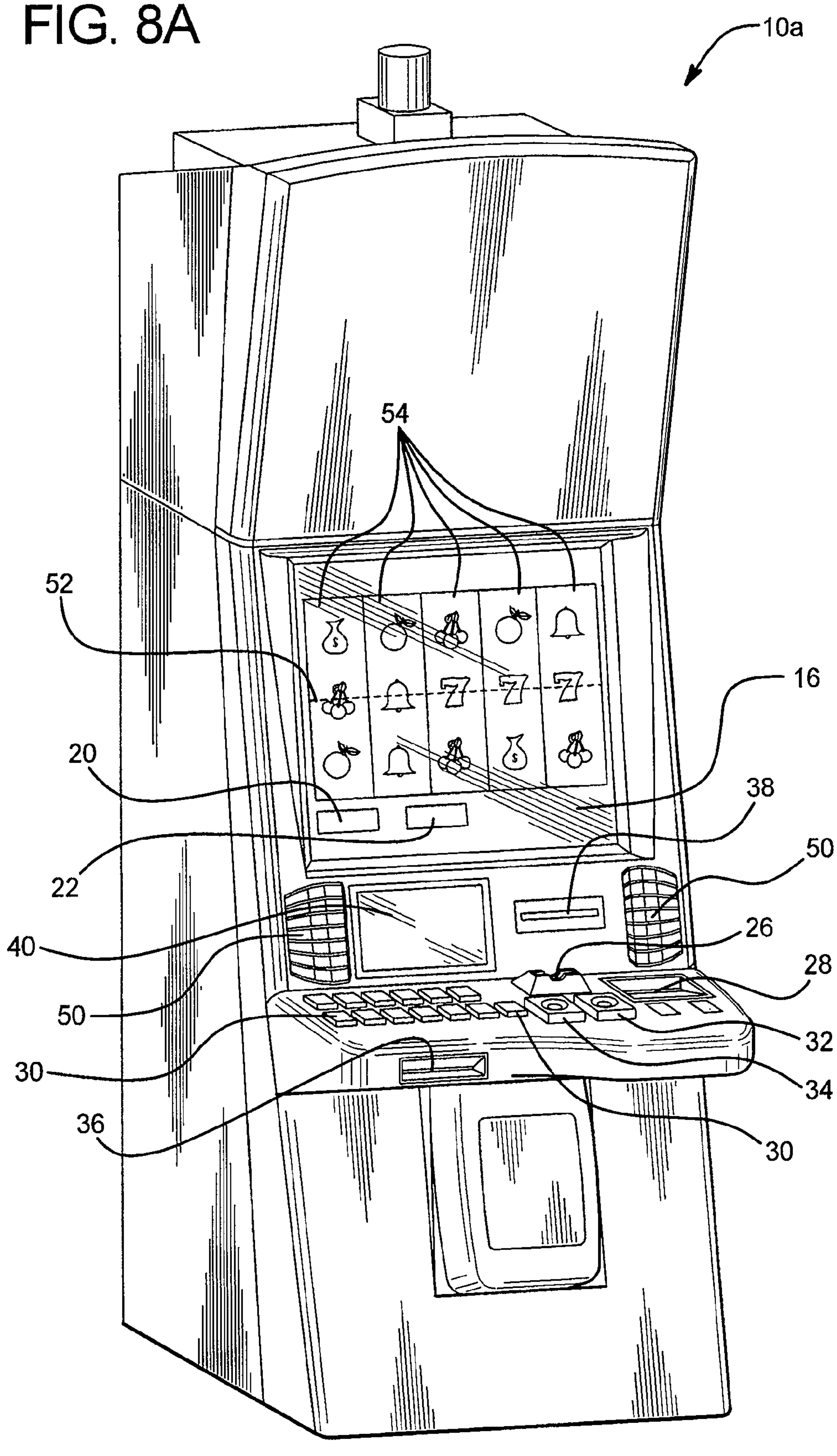
FIGS. 8A and 8B are front-side perspective views of one embodiment of the gaming device disclosed herein.
Figure 8B:
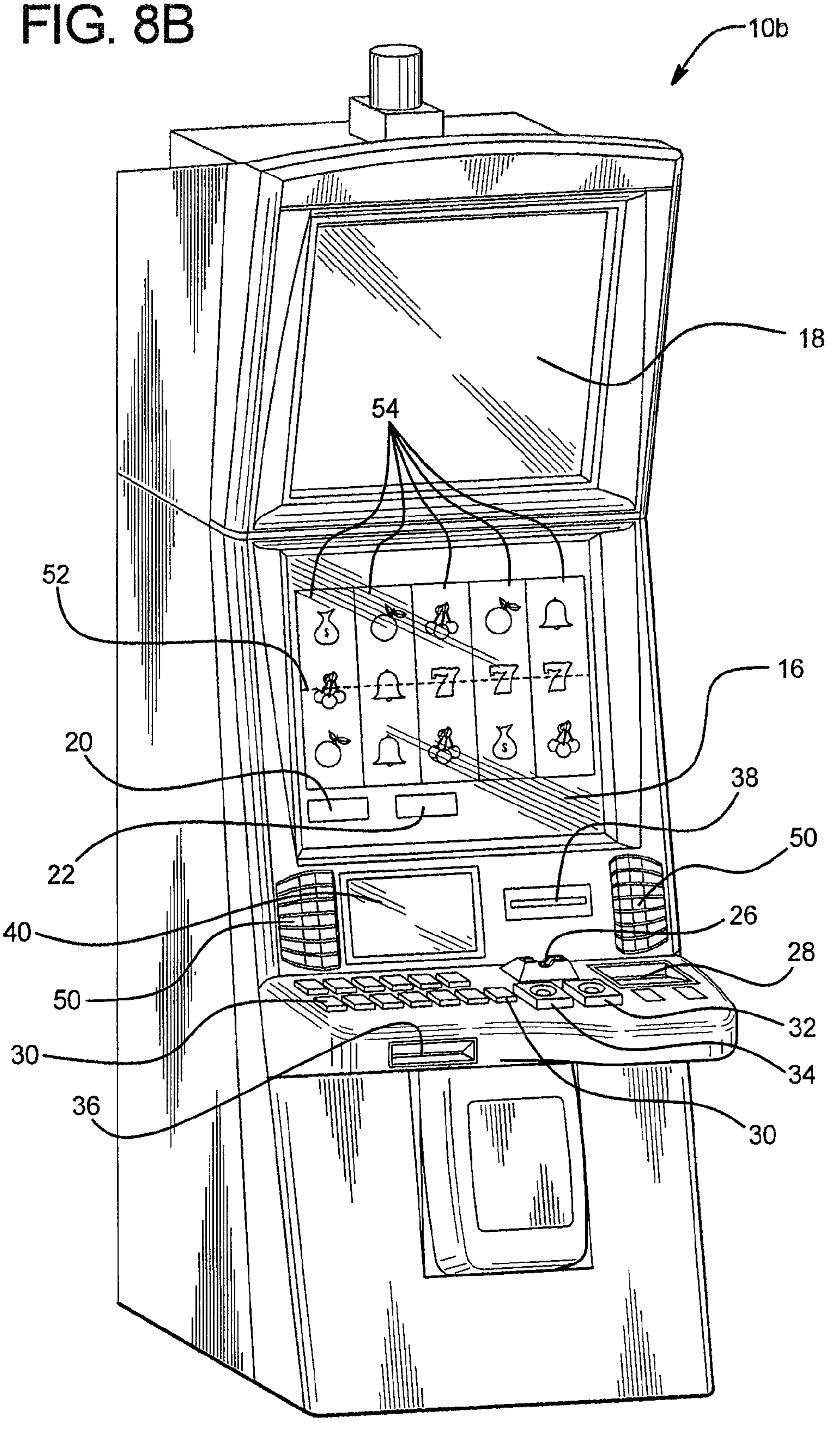

Referring now to the drawings, two example alternative embodiments of the gaming device disclosed herein are illustrated in FIGS. 8A and 8B as gaming device 10*a* and gaming device 10*b*, respectively. Gaming device 10*a* and/or gaming device 10*b* are generally referred to herein as gaming device 10.

In the embodiments illustrated in FIGS. 8A and 8B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 9A:
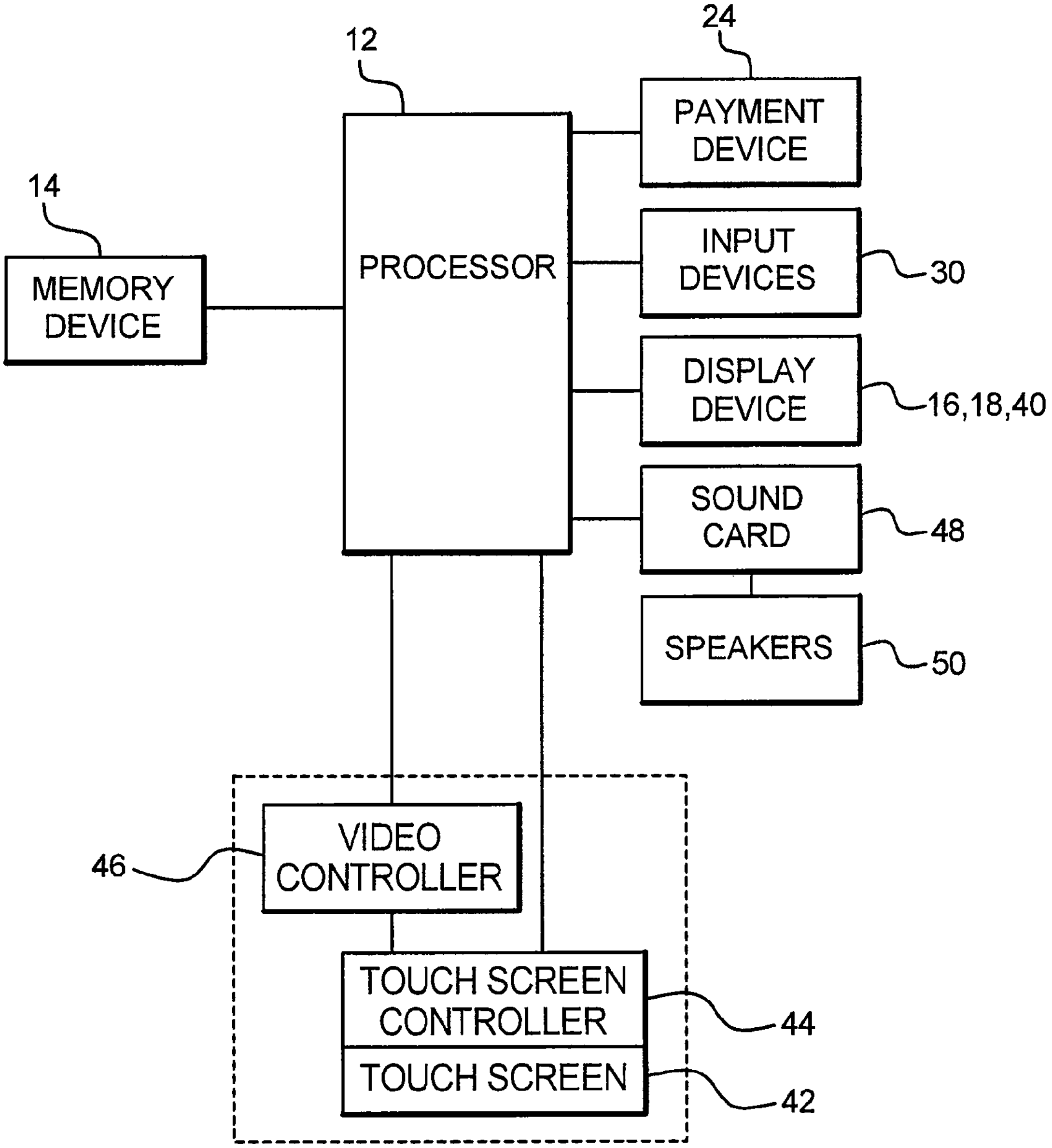
FIGS. 9A and 9B are schematics of one embodiment of the gaming device.

In one embodiment, as illustrated in FIG. 9A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 9A, the gaming device includes one or more display devices controlled by the processor. The display devices are preferably connected to or mounted to the cabinet of the gaming device. The embodiment shown in FIG. 8A includes a central display device 16 which displays a primary game. This display device may also display any suitable secondary game associated with the primary game as well as information relating to the primary or secondary game. The alternative embodiment shown in FIG. 8B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 9A, in one embodiment, the gaming device includes at least one payment device 24 in communication with the processor. As seen in FIGS. 8A and 8B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 8A, 8B and 9A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 9A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 9A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 8A and 8B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 8A and 8B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment as described herein, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 9B:
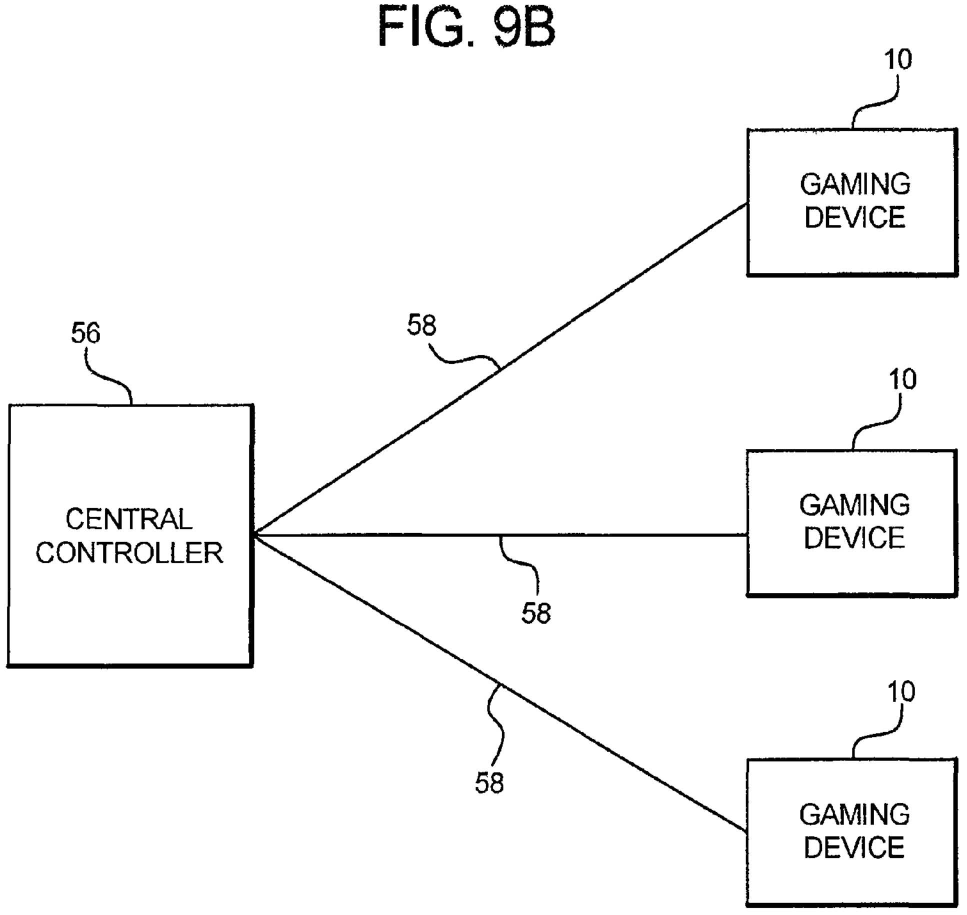
Figure 10:
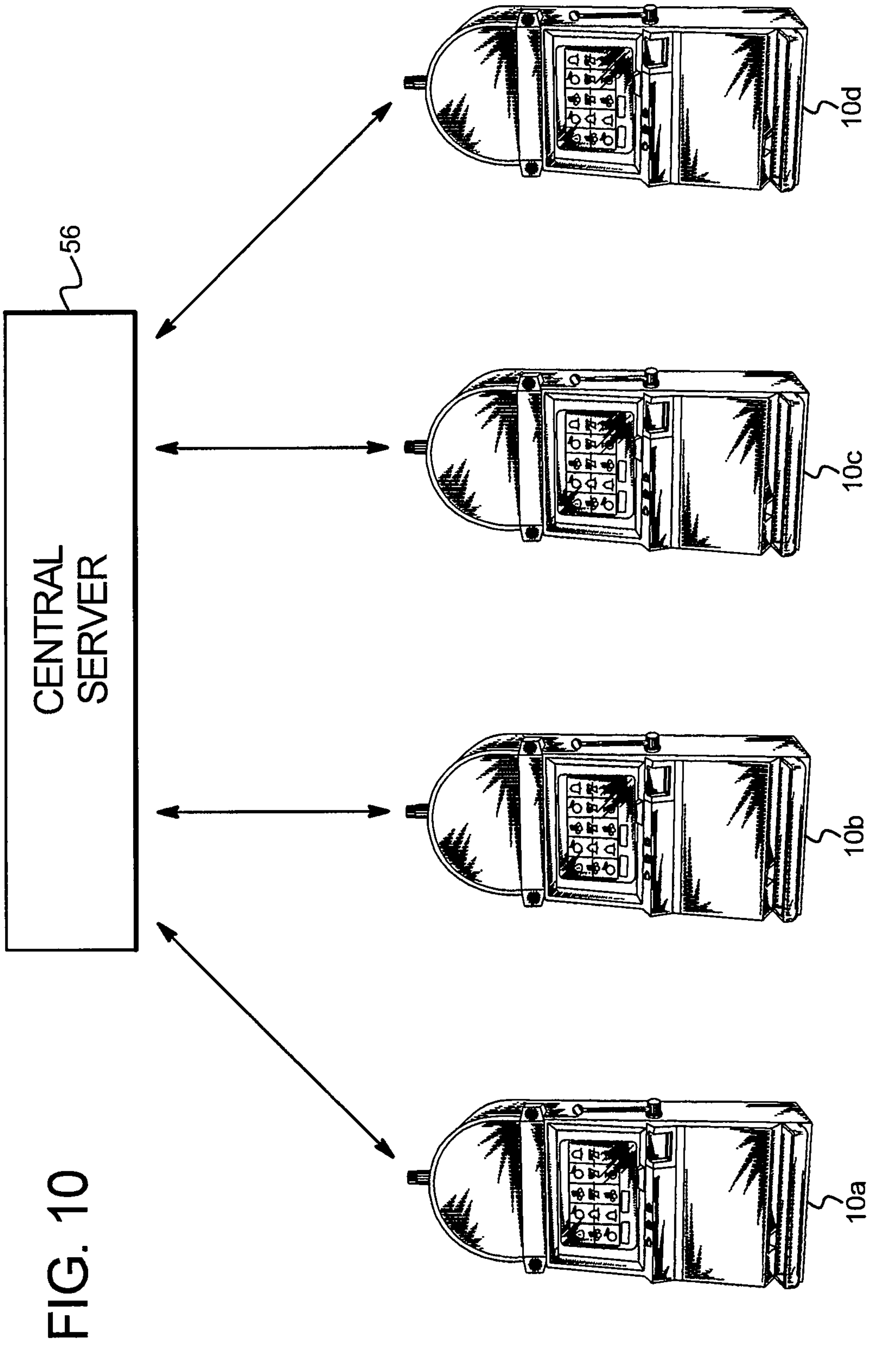
FIG. 10 is a view of multiple gaming devices in communication with a central server.

In one embodiment, as illustrated in FIG. 9B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, as discussed herein, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one gaming machine including:

at least one display device, at least one input device, at least one gaming machine processor, and at least one gaming machine memory device which stores a plurality of instructions, which when executed by the at least one gaming machine processor, cause the at least one gaming machine processor to operate with the at least one display device and the at least one input device to:

(a) receive an input to place a wager on a play of a game;

(b) for the wagered on play of the game:

(i) determine a game outcome, (ii) display, in a game window of the at least one display device, the determined game outcome, (iii) determine any game awards associated with the determined game outcome, and (iv) display any determined game awards associated with the determined game outcome;

(c) display, in a service window of the at least one display device, a plurality of different sporting event side bets;

(d) receive an input to select at least one of the displayed plurality of different sporting event side bets;

(e) transfer fund data representative of any selected sporting event side bets to a side bet revenue manager including at least one side bet revenue manager memory device and at least one side bet revenue manager processor configured to operate with said at least one side bet revenue manager memory device, said side bet revenue manager being independent of and distinct from the at least one gaming machine;

(f) receive fund data representative of any sporting event side bet awards from the side bet revenue manager; and (g) provide any sporting event side bet awards to a player;

a side bet controller independent of and distinct from the side bet revenue manager and the at least one gaming machine, said side bet controller configured to communicate with the side bet revenue manager to:

(i) accept said fund data representative of any selected sporting event side bets from the side bet revenue manager;

(ii) adjust at least one meter according to the fund data;

(iii) determine any outcomes of any selected sporting event side bets;

(iv) adjust said at least one meter according to any determined outcomes of any selected sporting event side bets; and (v) transfer said fund data representative of any sporting event side bet awards associated with any determined outcomes of any selected sporting event side bets to the side bet revenue manager; and wherein the side bet revenue manager is configured to communicate with the at least one gaming machine and the side bet controller to:

(A) accept and store said fund data representative of any selected sporting event side bets from the gaming machine;

(B) transfer said fund data to the side bet controller;

(C) track said fund data representative of any sporting event side bet awards from said at least one meter associated with the side bet controller; and (D) transfer said fund data to the gaming machine.

2. The gaming system of claim 1, wherein the plurality of different sporting event side bets are predetermined.

3. The gaming system of claim 1, wherein the plurality of different sporting event side bets are dynamically created.

4. The gaming system of claim 1, wherein the plurality of different sporting event side bets are based on at least one characteristic associated with the player.

5. The gaming system of claim 4, wherein the player characteristic is selected from the group consisting of at least one of a wager amount placed by the player, a status of the player, and a rate of play of the player.

6. The gaming system of claim 1, wherein the fund data transferred between the gaming machine and side bet controller are transferred using at least one cashless transfer meter.

7. The gaming system of claim 6, wherein the transfer of said fund data is accomplished through at least one distinct meter.

8. The gaming system of claim 1, wherein the side bet controller has at least one meter that tracks the side bet functionality.

9. The gaming system of claim 8, wherein each of the meters corresponds to a different sporting event side bet available.

10. The gaming system of claim 1, wherein the plurality of sporting event side bets are only available for certain of the at least one gaming machine.

11. The gaming system of claim 1, wherein the plurality of sporting event side bets are available in association with any play of any game of said at least one gaming machine.

12. A gaming system comprising a side bet controller;

at least one gaming machine independent of and distinct from the side bet controller, the at least one gaming machine including:

(i) at least one display device, (ii) at least one input device, (iii) at least one gaming machine processor, and (iv) at least one gaming machine memory device which stores a plurality of instructions, which when executed by the at least one gaming machine processor, cause the at least one gaming machine processor to operate with the at least one display and the at least one input device to:

(a) display a primary game upon a placement of a wager, (b) for the wagered on play of the primary game:

(i) determine a primary game outcome, (ii) display, in a game window of the at least one display device, the determined primary game outcome, (iii) determine any primary game awards associated with the determined primary game outcome, and (iv) display any determined primary game awards associated with the determined primary game outcome, (c) display, in a service window of the at least one display device, a plurality of different sporting event side bets, (d) receive an input to select at least one of the displayed plurality of different sporting event side bets, and (e) transfer fund data associated with any selected sporting event side bets; and a side bet revenue manager including at least one side bet revenue manager memory device and at least one side bet revenue manager processor configured to operate with said at least one side bet revenue manager memory device, said side bet revenue manager being independent of and distinct from the side bet controller and the at least one gaming machine, said side bet revenue manager configured to operate with the at least one gaming machine and the side bet controller to receive and track the fund data transferred between the at least one gaming machine and the side bet controller.

13. A side bet revenue manager comprising:

at least one memory device; and at least one processor configured to operate with said at least one memory device to:

(a) accept and store fund data representative of any of a plurality of different sporting event side bets placed via a service window of a gaming machine;

(b) transfer said fund data and a plurality of instructions to a side bet controller, said side bet controller being independent of and distinct from the side bet revenue manager and said instructions including:

(i) instructions to adjust at least one meter according to the fund data, (ii) instructions to determine any outcomes of any placed sporting event side bets, and (iii) instructions to adjust said at least one meter according to any sporting event side bet awards associated with any determined outcomes of any placed sporting event side bets;

(c) track said fund data representative of any sporting event side bet awards from said meters; and (d) transfer said fund data and a plurality of instructions to the gaming machine, said gaming machine being independent of distinct from the side bet revenue manager and the side bet controller, said instructions at least including instructions to provide any sporting event side bet awards to a player.

14. A side bet controller comprising:

at least one memory device; and at least one processor configured to operate with said at least one memory device to:

(a) accept fund data representative of any of a plurality of different sporting event side bets placed via a service window of a gaming machine;

(b) adjust at least one meter according to the fund data;

(c) determine any outcomes of any placed sporting event side bets;

(d) adjust said at least one meter according to any determined outcomes of any placed sporting event side bets; and (e) transfer said fund data representative of any side bet awards associated with any determined outcomes of any placed sporting event side bets and a plurality of instructions to a side bet revenue manager including at least one side bet revenue manager memory device and at least one side bet revenue manager processor configured to operate with said at least one side bet revenue manager memory device, said side bet revenue manager being independent of and distinct from the side bet controller and said instructions including:

(i) instructions to accept and store said fund data representative of any sporting event side bets placed, (ii) instructions to transfer said fund data to the side bet controller, (iii) instructions to track said fund data representative of any sporting event side bet awards, and (iv) instructions to transfer said fund data to a gaming machine, said gaming machine being independent of and distinct from the side bet revenue manager and the side bet controller.

15. A method of operating a gaming system, said gaming system including a side bet revenue manager configured to communicate with at least one gaming machine and a side bet controller, said method comprising:

(i) receiving an input to place a wager on a play of a game;

(ii) for the wagered on play of the game:

(i) causing at least one processor to determine a game outcome, (ii) causing at least one display device to display, in a game window, the determined game outcome, (iii) causing the at least one processor to determine any game awards associated with the determined game outcome, and (iv) causing the at least one display device to display any determined game awards associated with the determined game outcome;

(iii) causing the at least one display device to display, in a service window, a plurality of different sporting event side bets;

(iv) upon a placement of any of the displayed plurality of different sporting event side bets:

(a) causing the gaming machine to transfer fund data associated with any placed sporting event side bets to the side bet revenue manager, said side bet revenue manager being independent of and distinct from the gaming machine, (b) causing the side bet revenue manager to store the fund data associated with any placed sporting event side bets, and (c) causing the side bet revenue manager to transfer the fund data associated with any placed sporting event side bets to the side bet controller, said side bet controller being independent of and distinct from the side bet revenue manager and the gaming machine; and (v) upon a determination to provide a sporting event side bet award:

(a) causing the side bet controller to transfer fund data associated with the sporting event side bet award to the side bet revenue manager;

(b) causing the side bet revenue manager to store the fund data associated with the sporting event side bet award; and (c) causing the side bet revenue manager to transfer the fund data associated with the sporting event side bet award to the gaming machine.

* * * * *

UNITED STATES PATENT AND TRADEMARK OFFICE

CERTIFICATE OF CORRECTION

PATENT NO. : 9,039,515 B2
APPLICATION NO. : 11/924396
DATED : May 26, 2015
INVENTOR(S) : Cara Iddings It is certified that error appears in the above-identified patent and that said Letters Patent is hereby corrected as shown below:

IN THE CLAIMS

In Claim 1, Column 25, Line 43, after ";" insert --and--.
In Claim 1, Column 25, Line 60, delete "and".
In Claim 1, Column 25, Line 65, between "the" and "gaming" insert --at least one--.
In Claim 5, Column 26, Line 12, between the second instance of "the" and "player" insert --at least one--.
In Claim 6, Column 26, Line 17, between "the" and "gaming" insert --at least one--.
In Claim 6, Column 26, Line 17, between "and" and "side" insert --the--.
In Claim 9, Column 26, Line 26, after the second instance of "the" insert --at least one--.
In Claim 9, Column 26, Line 27, replace "meters" with --meter--.
In Claim 12, Column 26, Line 47, between "display" and "and" insert --device--.
In Claim 13, Column 27, Line 37, between "of" and "distinct" insert --and--.

Signed and Sealed this
Third Day of May, 2016

Michelle K. Lee

Michelle K. Lee
*Director of the United States Patent and Trademark Office*